US008718698B2

(12) United States Patent
Chaudhri et al.

(10) Patent No.: US 8,718,698 B2
(45) Date of Patent: *May 6, 2014

(54) METHOD AND APPARATUS TO FACILITATE DOWNLOAD SCHEDULING

(71) Applicant: Motorola Mobility LLC, Libertyville, IL (US)

(72) Inventors: Rohit Chaudhri, Schaumburg, IL (US); Jay R. Almaula, Bartlett, IL (US); Tzvetan T. Horozov, Hoffman Estates, IL (US); Michael D. Pearce, Barrington, IL (US); Venugopal Vasudevan, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,012

(22) Filed: Oct. 25, 2012

(65) Prior Publication Data
US 2013/0053090 A1 Feb. 28, 2013

Related U.S. Application Data

(63) Continuation of application No. 11/188,435, filed on Jul. 25, 2005, now Pat. No. 8,320,952.

(51) Int. Cl.
H04B 7/00 (2006.01)

(52) U.S. Cl.
USPC ............ 455/522; 455/69; 455/424; 455/453; 455/517; 455/510

(58) Field of Classification Search
USPC ............................ 455/69, 424, 453, 517, 510
See application file for complete search history.

(56) References Cited

U.S. PATENT DOCUMENTS

| 6,760,808 | B2 | 7/2004 | Peters et al. | |
| 7,328,049 | B2 | 2/2008 | Chanut | |
| 2002/0129693 | A1 | 9/2002 | Wilks | |
| 2004/0001087 | A1* | 1/2004 | Warmus et al. | 345/745 |
| 2004/0111476 | A1 | 6/2004 | Trossen et al. | |
| 2004/0117442 | A1* | 6/2004 | Thielen | 709/203 |
| 2004/0136404 | A1 | 7/2004 | Mahonen et al. | |
| 2004/0260786 | A1 | 12/2004 | Barile | |
| 2005/0027755 | A1 | 2/2005 | Shah et al. | |

* cited by examiner

Primary Examiner — Charles Appiah
Assistant Examiner — Randy Peaches

(57) ABSTRACT

A mobile station (201) receives (301) a transmission from a remote source (such as, but not limited to, a reference server (206)) comprising information regarding downloadable content. This information can comprise, in a preferred approach, addresses that can be used to download corresponding selections of downloadable content. This information can further comprise, in a preferred approach, characterizing information regarding at least some of the downloadable content selections identified via such addresses. In a preferred approach, such a mobile station can then also access (302) locally developed information regarding downloading constraints of interest and then make determinations (303) regarding when to automatically download at least a portion of at least one of the selections of downloadable content as a function, at least in part, of both the characterizing information as was received via the aforementioned transmission and the locally developed information regarding relevant downloading constraints.

17 Claims, 5 Drawing Sheets

METHOD AND APPARATUS TO FACILITATE DOWNLOAD SCHEDULING

This is a continuation of U.S. patent application Ser. No. 11/188,435 for Chaudhri et al., and assigned to Motorola Mobility LLC, while claiming the benefits thereof and incorporating by reference herein said application in its entirety.

TECHNICAL FIELD

This invention relates generally to mobile communications and more particularly to providing downloadable content to mobile stations.

BACKGROUND

Communication networks that support mobile stations are known and often comprise, at least in part, wireless edge elements. In some geographic areas some forms of wireless communication are nearly ubiquitous (such as, for example, wide area networks supported by cellular telephony). Other forms of wireless communication have, essentially by definition, a considerably smaller effective coverage area (such as, for example, 802.11-based networks using 802.11(a), 802.11(b), and/or 802.11(g)). Quality of service, characteristic power utilization, and corresponding costs are not usually equal as between various available networks. For example, wide area networks, though often available regardless of location, are many times relatively costly and support relatively slower data rates while wireless local area networks (though usually only sporadically available on a geographic basis) are often (though not always) relatively inexpensive and often support considerably higher data rates.

Mobile stations are increasingly available that can make compatible use of a plurality of different kinds of communication networks. For example, mobile stations exist and/or are planned that can selectively operate using one or more wide area networks while also having the ability to also selectively operate using one or more forms of wireless local area network connectivity. Such platforms may support yet additional forms of wireless connectivity including, but not limited to, Bluetooth, infrared, and one or more other proprietary or public schemes, to name but a few.

Users have a growing expectation regarding such mobile stations. In particular, many users seek an increasing range and depth of application capabilities and experiences that rely, at least in part, upon an ability to download content from content sources of interest. Such content may comprise, for example, audio content, video content, audio-video content, text, business presentations (such as Powerpoint presentations), and so forth. As such platforms become a more important personal and business tool for many users, such demands increase. This, in turn, brings increasing challenges with respect to adequately meeting such needs.

As one example, mobile stations typically have limited resources that can be greatly challenged by the downloading, storage, and usage requirements of a given user. Memory capacity, for example, provides a clear example in this regard. It has become almost a cliché that today's "adequate memory" will tomorrow be utterly inadequate to meet a user's needs and requirements. Power consumption, too, provides another clear example of these concerns. Mobile stations are typically portable platforms and carry a self-contained source of power (such as a battery). Power capacity can usually be increased by providing a larger storage mechanism. This, however, runs contrary to the typical user demand that such platforms remain small (or achieve even smaller form factors going forward). Unsupervised downloading, storage, and usage requirements, however, can pose increased power consumption demands that run contrary to such trends and desires.

BRIEF DESCRIPTION OF THE DRAWINGS

The above needs are at least partially met through provision of the method and apparatus to facilitate download scheduling described in the following detailed description, particularly when studied in conjunction with the drawings, wherein.

Figure 1:
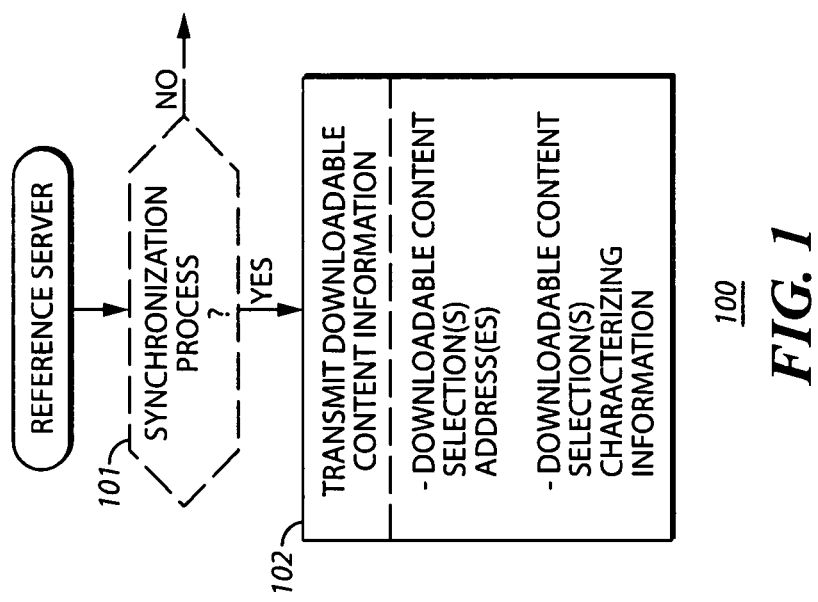
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a mobile station receives a transmission from a remote source (such as, but not limited to, a reference server) comprising information regarding downloadable content. This information can comprise, in a preferred approach, addresses that can be used to download corresponding selections of downloadable content. This information can further comprise, in a preferred approach, characterizing information regarding at least some of the downloadable content selections identified via such addresses.

In a preferred approach, such a mobile station can then also access locally developed information regarding downloading constraints of interest and then make determinations regarding when to automatically download at least a portion of at least one of the selections of downloadable content as a function, at least in part, of both the characterizing information as was received via the aforementioned transmission and the locally developed information regarding relevant downloading constraints.

Such a transmission and these actions can comprise a part, if desired, of a synchronization routine. So configured, a mobile station can work to synchronize its contents with the specified or anticipated needs of a corresponding user. Pursuant to these teachings, however, this synchronization can leverage the occurrence or possibility of occurrence of various kinds of connectivity options. These teachings also permit leveraging the temporal requirements of such a user. So configured, for example, a mobile station may avoid downloading complete versions of a large number of downloadable selections as an initial consolidated action and thereby avoid the corresponding immediate power consumption, the corresponding time requirement to complete such downloading, the costs as may be associated with a presently available mode of connectivity, and/or the possibility that the mobile station's available memory is inadequate to retain such a quantity of content.

Instead, downloadable content can be automatically downloaded during the course of a user's day and as the mobile station moves through various connectivity options and opportunities. If desired, downloaded content that has already been consumed by the user can be automatically discarded to make way for new content. Furthermore, in an optional but preferred approach, these processes can be managed to tend to maintain the available memory (or at least that portion of the memory as is usually used to store downloaded content of interest) in a relatively full state. So configured, as much content as can reasonably be accommodated can be held in readiness for the user thereby tending to provide the user with an experience suggesting that all content of interest is presently available in full. As the content is consumed replacement content can be downloaded using cost efficient modes of connectivity (when possible) to thereby tend to minimize the expense of maintaining such information in readiness for the user.

These and other benefits may become clearer upon making a thorough review and study of the following detailed description. Referring now to the drawings, and in particular to FIG. 1, a reference server as mentioned above can employ a process 100 in support of these teachings. If desired, this process 100 can comprise, or be triggered by, a synchronization process. More particularly, this process 100 can optionally provide the step 101 of determining whether a corresponding synchronization process is presently being facilitated for a given mobile station. (As used herein, those skilled in the art will understand that such synchronization refers to a process whereby particular content as between two or more points of storage and/or usage are made similar; i.e., the content has been synchronized.)

When true this process 100 then provides the step 102 of effecting a transmission to the mobile station of information regarding downloadable content of interest; that is, downloadable content that should be downloaded to the mobile station in order for the mobile station's content to be synchronized as per the requirements of the synchronization activity. The content of this information can and will vary with the needs and/or requirements of a given application setting. In a preferred approach, however, this information will at least comprise addresses that can be used to download corresponding selections of the downloadable content as well as characterizing information regarding at least some of these selections of downloadable content.

These addresses can comprise, for example, Uniform Resource Locators (URL's) that identify specific Internet sites (which URL's are well known in the art) though other types of address may also be supported. The characterizing information can and will vary greatly with the specifics of a given context. In general, this characterizing information will preferably provide substantive content that will facilitate the scheduling decisions of the mobile station that receives such information. Illustrative examples of potentially useful characterizing information include, but are certainly not limited to:

- an absolute size of a given selection of downloadable content (such as a specific number bytes);
- a relative size of a given selection of downloadable content (such as an indication that a first selection is twice as large as a second selection or that a first portion of a first selection is half the size of a second portion of that same first selection);
- a cost that is associated with downloading a given selection of downloadable content (such as a premium add-on cost or a fixed per-download cost that is associated with this particular selection);
- information corresponding to a predicted throughput rate that is associated with downloading a given selection of downloadable content (where, for example, a relatively lower downloading rate is anticipated due to high volume usage of the corresponding content server that offers this particular selection);
- a priority level that is associated with a given selection of downloadable content (which priority level might be assigned as a function, at least in part, of criteria previously established by the user);
- a priority level that is associated with a group to which a given selection of downloadable content belongs (which priority level might be assigned as a function, at least in part, of criteria previously established by a group, such as an affinity group, to which the user belongs, subscribes, or otherwise monitors);
- a time when a given selection of downloadable content will become available by downloading;
- a time after which a given selection of downloadable content will be withdrawn from downloading availability;
- a time after which a given selection of downloadable content will expire (which expiration time may be established, for example, by the content provider and/or by user-established criteria);
- a time during which a given selection of downloadable content will likely be of a higher value to a user of the mobile station (where, for example, the selection does not have an expiration time as such associated therewith but which nevertheless entails content that will likely become stale with time);
- information corresponding to power requirements associated with a given selection of downloadable content (such as, but not limited to, power requirements associated with downloading all or part of the selection, storing the selection, and/or processing and consuming the selection following downloading); and/or
- information corresponding to power requirements associated with a group to which a given selection of downloadable content belongs; to name but a few.

So configured, those skilled in the art will recognize and understand that these teachings do not require downloading of downloadable content upon facilitating a synchronization process. Instead, these teachings facilitate the provision of information to a mobile station regarding downloadable content that should (or could) be downloaded to effect such synchronization and where such content can be obtained. Further, these teachings provide information to such a mobile station to permit self-scheduling of the downloading of any particular downloadable content or portion thereof. Additional description regarding such scheduling is provided herein.

Figure 2:
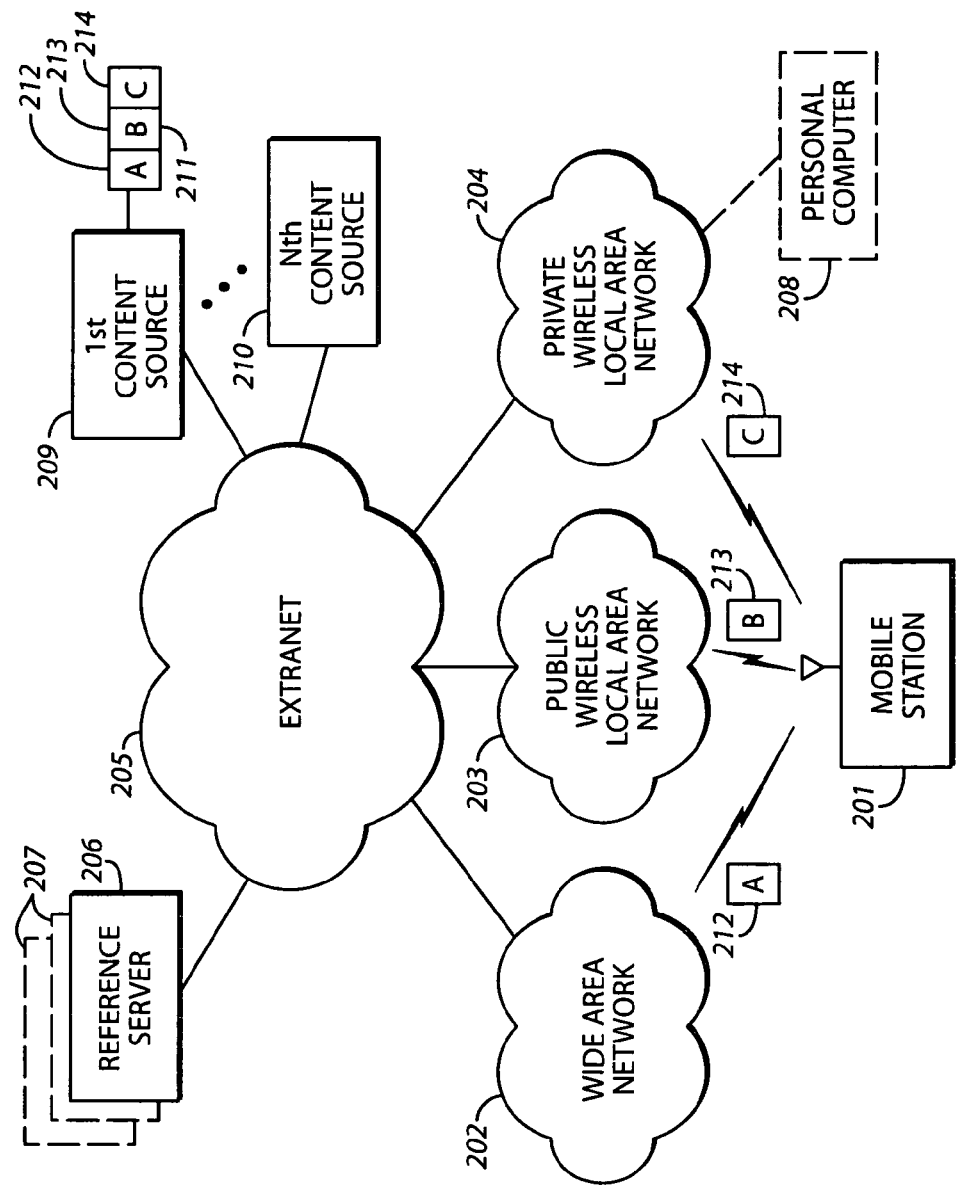
FIG. 2 comprises a block diagram as configured in accordance with various embodiments of the invention.

Referring now to FIG. 2, it may be helpful to briefly study an exemplary context to illustrate certain aspects of these teachings. Those skilled in the art will recognize and understand that this depiction serves only an illustrative purpose and does not constitute an exhaustive rendering of all possibly relevant user paradigms that may benefit from these teachings.

In this illustrative context, a mobile station 201 may operate compatibly with any of a wide area network 202 (which may be presumed to provide essentially ubiquitous but somewhat costly connectivity), a public wireless local area network 203 (which may be presumed to provide geographically sporadic but essentially low-cost connectivity), and a private wireless local area network 204 (such as a home wireless local area network that is limited to at-home usage but is free as well). Each of these networks 202, 203, and 204 operably couples to an extranet 205 such as, but not limited to, the Internet. A reference server 206 (and possibly a plurality of relevant reference servers as is denoted by reference numeral 207) also couples to this extranet 205. This reference server 206 can comprise an independent, dedicated platform operated, for example, by a third party. Such a server can be effected in other ways, however, as will be readily noted by those skilled in the art. For example, the reference server functionality can be supported, if desired, by a personal computer 208 as is owned and operated by the mobile station user. In such an example, the personal computer 208 will itself comprise the reference server for these purposes.

So configured, the reference server 206 (or servers 207) can respond to a synchronicity activity (as may be initiated, for example, by the mobile station 201 using known practice and protocol in this regard) by transmitting the above-described downloadable content information via the extranet 205 and via the particular point of connectivity to which the mobile station 201 is presently attached. Since this transmission essentially comprises addresses and characterizing information and not the downloadable content itself, the transmission will be relatively small in size and will likely be well accommodated via any of the described networks from a temporal availability, bandwidth availability, and budgetary point of view.

These addresses identify, in this illustrative example, a plurality of content sources comprising a first content source 209 through an Nth content source 210 (where "N" comprises an integer greater than "1"). The characterizing information (along with other information as will be described herein) is then usable by the mobile station 201 to facilitate the scheduling of the downloading of at least one of the selections of downloadable content as a function thereof.

For example, the first content source 209 may have a first selection of downloadable content 211. The mobile station 201, using the characterizing information provided by the reference server 206 and other information as may be locally available, can schedule the downloading of a first section A 212 of this first selection of downloadable content 211 to occur via the wide area network 202. This might be done, for example, when the mobile station 201 seeks to achieve a present availability of a first portion of the downloadable content selection 211 at a time when only the wide area network connectivity is available.

At a later time (when, for example, the mobile station 201 has begun to consume the previously downloaded selection section A 212) the mobile station 201 may automatically schedule the downloading of a next section B 213 of the selection 211. In this example, this downloading event occurs via the public wireless local area network 203 to which the mobile station 201 is then attached. This, in turn, illustrates both that the mobile station 201 is effectively managing its memory capacity in a way that is both tending to ensure present availability of potentially needed content while also leveraging the sporadic availability of lower-cost connectivity events.

At a still later time in this example the mobile station 201 completes the downloading of this particular selection 211 by receiving the third and last section C 214 of this selection 211 via the private wireless local area network 204.

Again, those skilled in the art will recognize that this example serves an illustrative purpose only. There are essentially innumerable ways by which these teachings can be carried out to suit and/or effectively leverage the limitations and/or opportunities of a given application setting.

Figure 3:
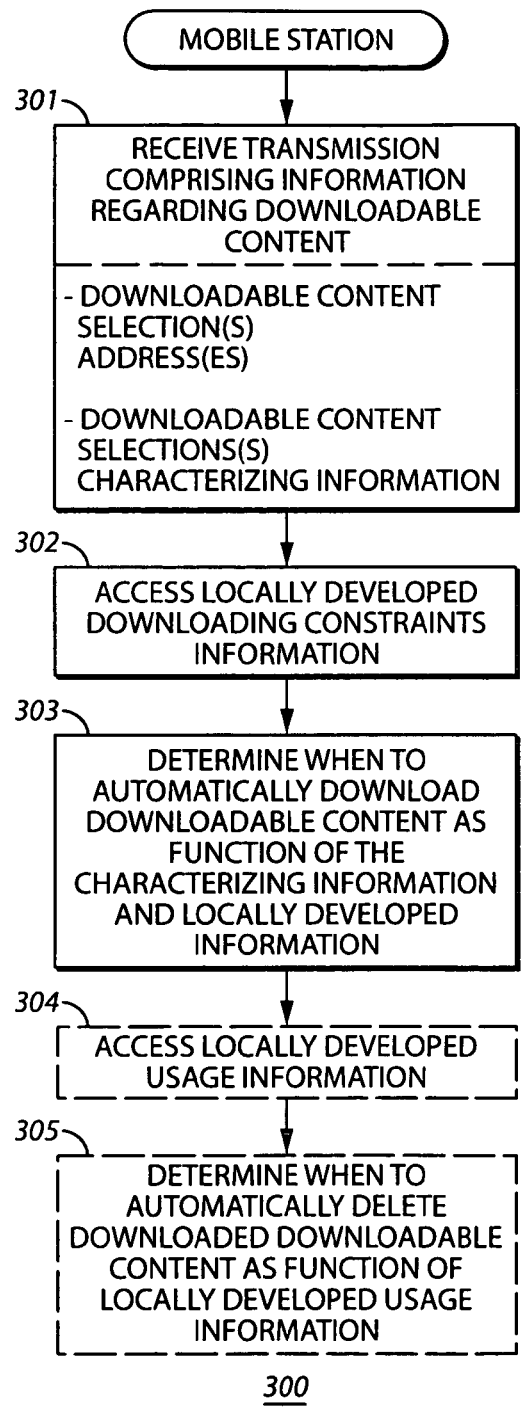
FIG. 3 comprises a flow diagram as configured in accordance with various embodiments of the invention.

Referring now to FIG. 3, to benefit from these teachings, a mobile station as described above will preferably support a corresponding process 300. Pursuant to this process 300, by one step 301 the mobile station will receive a first transmission from a remote source (such as a reference server or servers) that comprises information regarding addresses that can be used to download corresponding selections of downloadable content and characterizing information regarding at least some of the selections of downloadable content as has already been described above.

In addition, and as per a preferred approach, this process 300 also supports the step 302 of accessing locally developed information regarding downloading constraints of objective or subjective interest. "Locally developed" simply refers to the notion of information developed, at least in significant part, by or at the mobile station itself (via corresponding user input and/or corresponding monitors, sensors, and/or calculating and/or processing algorithms and methods). Such downloading constraints comprise, in general, factors that will or may influence downloading choices by the mobile station. Examples include, but are certainly not limited to:

presently available communication channels by which the downloadable content can be downloaded (such as wide area network channels as versus wireless local area network channels);

a quantity of data per unit time as may be presently available via a particular presently available communication channel by which the downloadable content can be downloaded;

a cost that is associated with a presently available communication channel by which the downloadable content can be downloaded (such as a monetary cost);

predicted availability of a given communication channel by which the downloadable content can be downloaded (based, for example, upon a present location and direction and rate of movement, availability history as may be developed by the mobile station, and so forth);

a present power capacity state of the mobile station;

a calculated future power capacity state of the mobile station (taking into account, for example, an amount of power that will remain available following the downloading of a given downloadable content selection);

at least one of a day and a time;

capacity status of a mobile station memory; and a power drain per unit of transferred data of a particular presently available communication channel by which the downloadable content can be downloaded;

to name but a few.

A next step 303 then determines when to automatically download at least a portion of at least one of the selections of downloadable content as a function, at least in part, of both the characterizing information as was received from the reference server and the locally developed information regarding downloading constraints of interest. Such scheduling can favor, in a given instance, performance goals of choice (with it being understood that such performance goals themselves may change over time and possibly on an automatic and dynamic basis).

For example, such scheduling may be conducted in order to at least attempt to minimize the overall cost of downloading the downloadable content while simultaneously tending to ensure that downloadable content is downloaded and available for use at the mobile station on an as-needed basis. So configured, the mobile station might tend to favor partially, but not fully, downloading initial segments of downloadable content selections when initial access is via a more expensive avenue of connectivity. This partial download will permit a user to begin consuming the content if they so wish. When and if this occurs the mobile station can then re-contact the content server to download subsequent portions of that selection. This may occur when a lower cost form of connectivity is available, thus permitting a cost savings. Also, as other downloaded content is consumed it may be possible to dynamically delete that consumed content (as is discussed below in more detail) and opportunistically download additional portions of the selection as low-cost connectivity opportunities present themselves.

As another example, such scheduling may be conducted in order to intentionally and automatically manage power consumption as is experienced by the mobile station due to downloading of the downloadable content while also simultaneously tending to ensure that downloadable content is downloaded and available for use at the mobile station on an as-needed basis. For example, power consumption may be higher when downloading via a wide area network as versus a wireless local area network. A mobile station might therefore tend to favor downloading only an initial portion of a given selection when only a form of connectivity having a relatively higher power consumption characteristic associated therewith is available. This partial availability of the selection will permit a user to begin consuming the selection while also offering the mobile station at least the possibility of minimizing power consumption by downloading some or all of the selection at a time when a form of connectivity having a lower corresponding power consumption characteristic becomes available.

And as yet another example, such scheduling may be conducted in order to ensure that a mobile station memory as is available to store downloadable content tends to remain relatively full. This approach, for example, may be used to increase the likelihood that a user's experience will tend to mimic the experience that would prevail when all available downloadable content had already been fully downloaded. That is, by essentially fully using available memory capacity, the immediate consuming needs of a user can more likely be at least initially met even when insufficient memory exists to presently store all available synchronizable content.

If desired, this process 300 can further provide the optional step 304 of accessing locally developed information regarding usage of downloaded downloadable content at the mobile station. This, in turn, can facilitate a step 305 by which the mobile station determines when to automatically delete at least a portion of at least one selection of downloaded downloadable content as a function, at least in part, of such usage. So configured, the mobile station can clear consumed content in order to free up capacity to download and store further content. It is possible, of course, that the user may wish to reuse already consumed content. With that in mind, the locally developed downloading constraints as were mentioned earlier may further comprise criteria in this regard. For example, a particular kind of downloaded content may be characterized as requiring stored persistence for at least some period of time notwithstanding usage.

Figure 4:
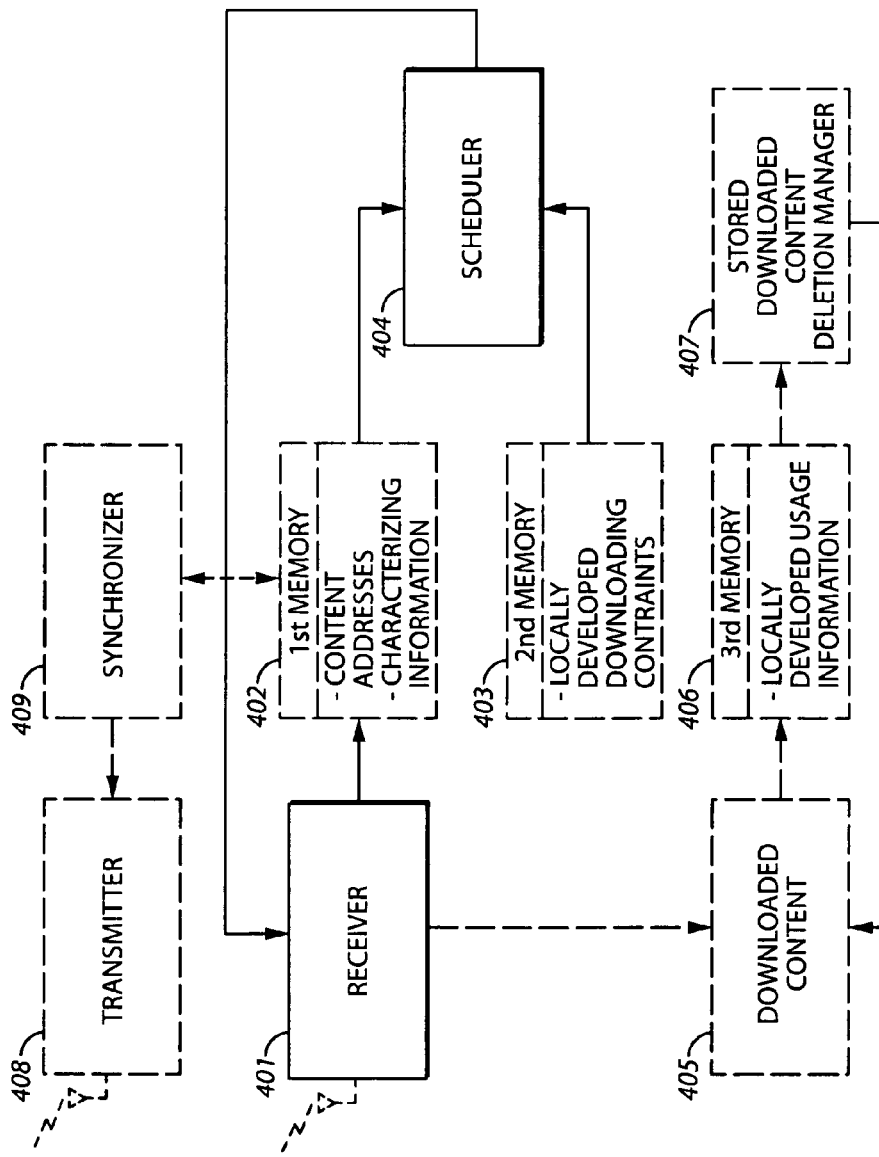
FIG. 4 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will now be provided.

In this illustrative embodiment a mobile station 201 comprises a receiver 401, a first and second memory 402 and 403, and a scheduler 404. The receiver 401 preferably comprises, at least in part, a wireless receiver and is configured and arranged to compatibly receive transmissions such as those described above. Further in accord with a preferred approach this receiver 401 comprises an agile platform (or, in the alternative, comprises a plurality of different receivers) that is capable of compatible interaction with a variety of networks such as those described above. The details for such a receiver will of course vary with the details of a given application. Furthermore, these teachings are not particularly dependent upon the use or selection of any particular receiver and in fact are likely usable with many or all presently known or hereafter developed receivers. For all these reasons and further for the sake of brevity, additional elaboration regarding such receivers will not be provided here.

The first memory 402 operably couples, in this illustrative embodiment, to the receiver 401 and serves to store at least some of the contents of transmissions as are received via the receiver 401 from a remote source (such as the previously described reference server). In particular, in a preferred approach this memory 402 stores the received addresses that can be used to download corresponding downloadable content selections as well as the characterizing information regarding at least some of these selections. The second memory 403, in a preferred approach, stores the information regarding relevant downloading constraints as were outlined above and as may be locally developed by one or more native components (not shown) of the mobile station 201.

If desired, these two memories 402 and 403 can comprise discrete platforms as is suggested by the illustration. Those skilled in the art, however, will understand and recognize that this depiction may also be viewed as a logical depiction. Accordingly, it will also be understood that these memories can comprise a single shared platform or can be further distributed over a greater number of storage platforms which may, in turn, comprise a portion of other components shown or not shown.

The scheduler 404 is responsive to the contents of the first and second memories 402 and 403. In a preferred embodiment, this scheduler 404 is configured and arranged (via, for example, programming as corresponds to the teachings set forth above) to schedule when the mobile station 201 automatically downloads at least a portion of at least one of the selections of downloadable content (and preferably is programmed to control the scheduling of essentially all such automated downloading activity) as a function, at least in part, of both the characterizing information and the locally developed information.

So configured, the mobile station 201 will automatically download downloadable content selections from time to time and from place to place. Such content, when downloaded, may be stored, for example, in one or more downloaded content memories 405. Once downloaded, the content is then available for use by the user of the mobile station.

As mentioned earlier, it may be useful at least in some settings to arrange for the automated deletion of previously downloaded content. A simple approach would simply arrange for the immediate deletion of content as it is consumed. In other cases it may be desirable to arrange for a more sophisticated and informed approach. In either case, it may be desirable to optionally provide a third memory 406 that stores locally developed information regarding usage of downloaded downloadable content at the mobile station 201. A stored downloaded content deletion manager 407 that is responsive to the contents of the third memory 406 can then be configured and arranged to automatically delete at least a portion of at least one selection of downloaded downloadable content as a function, at least in part, of the locally developed information regarding usage of the downloaded downloadable content.

This stored downloaded content deletion manager 407 can comprise a separate discrete component if desired or can be partially or wholly incorporated into the functionality of the platform that serves as the scheduler 404 in a given embodiment. Such architectural options will be well understood by those skilled in the art and require no further explanation here.

As mentioned above, these teachings may have particular applicability in a synchronization context. Accordingly, it may also be desirable to provide the mobile station 201 with a transmitter 408 that couples, in turn, to a synchronizer 409. So configured, the synchronizer 409 can cause the transmission of one or more messages that, upon receipt by the reference server, will initiate facilitation of a synchronization process that can include the reference server transmission described above.

Figure 5:
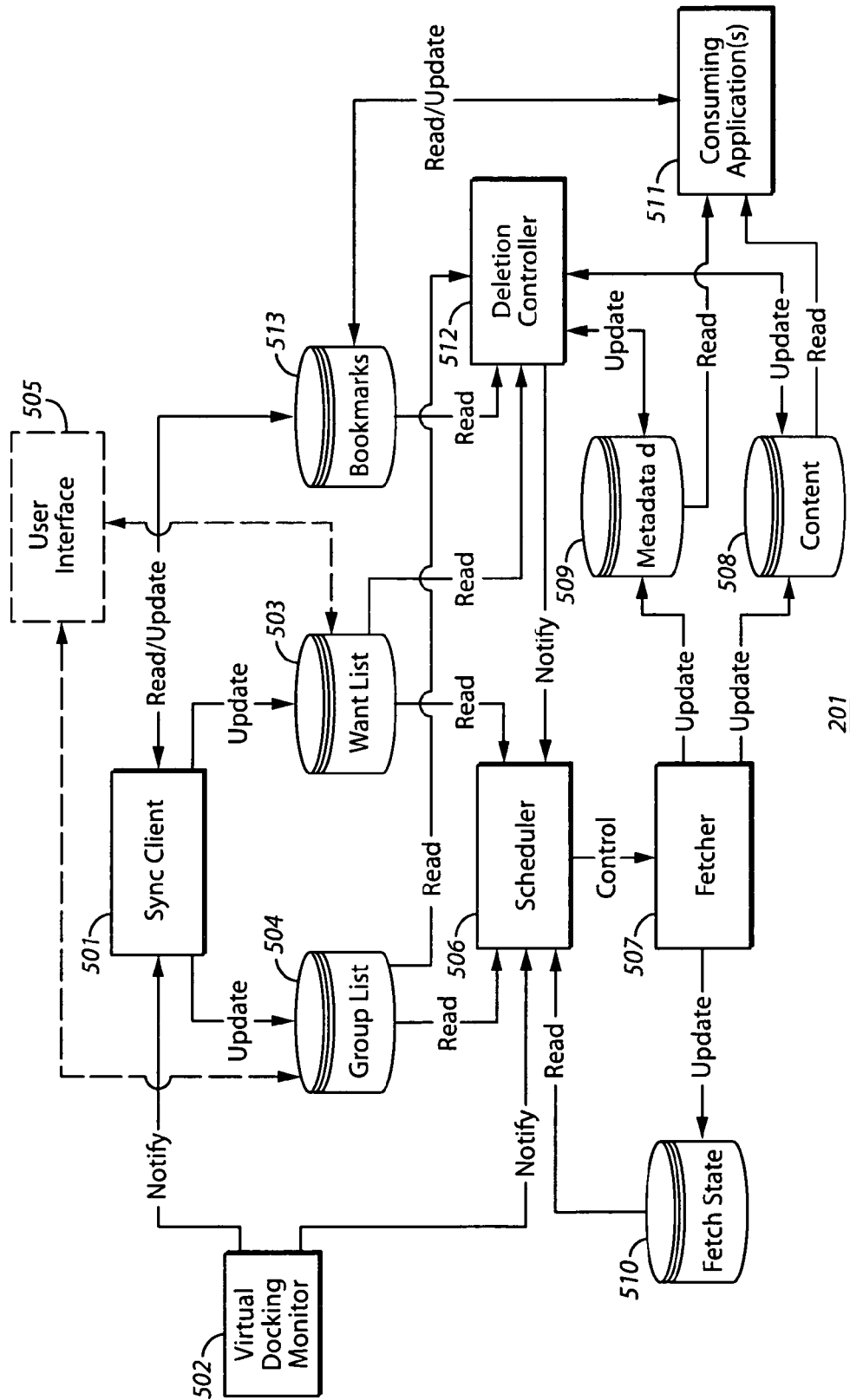
FIG. 5 comprises a block diagram as configured in accordance with various embodiments of the invention.

Referring now to FIG. 5, a more specific example of a mobile station instantiation will be provided.

In this embodiment, a sync client 501 serves to support and facilitate the aforementioned synchronization activity in general accord with otherwise well-established prior art practice in this regard. The sync client 501 receives notifications from a virtual docking monitor 502 which detects when one or more connectivity opportunities are presently available and otherwise provides a point of information ingress. The sync client 501 in turn operably couples to a want list 503 and a group list 504. These lists comprise, for example, the addresses for downloadable content selections as have been described above with the group list 504 comprising, for example, playlists and the like. If desired, a user interface 505 can also be optionally provided to permit direct user interaction with the want list 503 and the group list 504 (to facilitate, for example, updating those lists via deletions and/or additions).

The want list 503 and the group list 504 are, in turn, coupled to and read by a scheduler which also receives connectivity opportunity notifications from the virtual docking monitor 502. This scheduler preferably operates as described above and makes downloading scheduling decisions based upon the above-described synchronization information as well as locally developed information regarding downloading constraints of interest or concern. So configured, the scheduler 506 controls, at least in part, the operations of a fetcher 507 that downloads the downloadable content (and corresponding content metadata as is known in the art) which is stored in a corresponding content memory 508 (and a corresponding metadata memory 509).

As described above, these teachings are compatible for use with (and are able to effectively leverage) partial as versus complete downloads of given content selections. To facilitate this agility, this embodiment further comprises a fetch state memory 510 that is updated by the fetcher 507 and which is read by the scheduler 506 such that subsequent downloads to complete only partially downloaded content can be accommodated and taken into account.

The content 508 (and corresponding metadata 509) are provided to one or more consuming applications 511 of choice where the content (and metadata) are consumed through use. Consumption, however, does not necessarily equate with deletion. Accordingly, this embodiment also provides for a deletion controller 512 that couples to the downloaded content 508 and the downloaded metadata 509. This deletion controller 512 uses this information (along with information from the want list 503 and the group list 504) to provide delete instructions to the memory facilities that retain the content and metadata. This, in turn, provides a mechanism whereby such downloaded information is deleted to thereby make storage space available to subsequent downloads. In this embodiment the deletion controller 512 notifies the scheduler 506 regarding such deletion events in order to allow the scheduler 506 to take the existence of such storage space into account when making the above-described scheduling decisions.

It is anticipated, of course, that a given user may not fully complete consumption of a given downloaded content selection notwithstanding initiation of such consumption. For example, the user may pause such consumption for any number of reasons. To accommodate such a circumstance, this embodiment also provides for a bookmarks memory 513. This bookmarks memory 513 monitors the state (or degree) of consumption for the various selections as have been downloaded and makes this information available, for example, to the aforementioned deletion controller 512. The latter may use this information, for example, to persist already-consumed information as corresponds to a given selection when a user pauses consumption instead of deleting that consumed content. For example, when a user pauses in this way, it may be expected that the user will wish to replay at least a portion of the already-consumed content in order to facilitate recollection of what has already been consumed.

These teachings are readily deployed in a variety of settings and may be expected to work compatibly with a variety of applications. So configured, the platform designer has great flexibility and choice with respect to whether and how to emphasize power consumption control, transmission costs control, and/or memory management with respect to the synchronization-based downloading activity of a given mobile station.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   at a mobile station:
      receiving a first transmission from a remote source comprising information regarding downloadable content, wherein the information comprises:
         addresses that can be used to download corresponding selections of downloadable content; and
         characterizing information regarding at least some of the selections of downloadable content;
      accessing locally developed information regarding downloading constraints;
      determining when to automatically download only a portion of at least one of the selections of downloadable content as a function, at least in part, of both the characterizing information and the locally developed information.

2. The method of claim 1 wherein availability of the downloadable content to a user is automatically managed.

3. The method of claim 1 wherein the addresses comprise Uniform Resource Locators that identify specific Internet sites.

4. The method of claim 1 wherein the characterizing information comprises at least one of:
an absolute size of a given selection of downloadable content;
a relative size of a given selection of downloadable content;
a cost that is associated with downloading a given selection of downloadable content;
information corresponding to a predicted throughput rate that is associated with downloading a given selection of downloadable content;
a priority level that is associated with a given selection of downloadable content;
a priority level that is associated with a group to which a given selection of downloadable content belongs;
a time when a given selection of downloadable content will become available by downloading;
a time after which a given selection of downloadable content will be withdrawn;
a time after which a given selection of downloadable content will expire;
a time during which a given selection of downloadable content will likely be of a higher value to a user of the mobile station;
information corresponding to power requirements associated with a given selection of downloadable content;
information corresponding to power requirements associated with a group to which a given selection of downloadable content belongs.

5. The method of claim 1 wherein the locally developed information comprises at least one of:
presently available communication channels by which the downloadable content can be downloaded;
a quantity of data per unit time as may be presently available via a particular presently available communication channel by which the downloadable content can be downloaded;
a cost that is associated with a presently available communication channel by which the downloadable content can be downloaded;
predicted availability of a given communication channel by which the downloadable content can be downloaded;
a present power capacity state of the mobile station;
a calculated future power capacity state of the mobile station;
at least one of a day and a time;
capacity status of a mobile station memory;
a power drain per unit of transferred data of a particular presently available communication channel by which the downloadable content can be downloaded.

6. The method of claim 1 wherein determining when to automatically download at least a portion of at least one of the selections of downloadable content as a function, at least in part, of both the characterizing information and the locally developed information further comprises determining when to automatically download at least a portion of at least one of the selections of downloadable content as a function, at least in part, of both the characterizing information and the locally developed information such that an overall cost of downloading the downloadable content becomes minimized while ensuring that downloadable content is downloaded and available for use at the mobile station on an as-needed basis.

7. The method of claim 1 wherein the portion of at least one of the selections of downloadable content is only an initial portion of the at least one of the selections of downloadable content.

8. The method of claim 1 wherein the portion of at least one of the selections of downloadable content is only a portion subsequent to a previously downloaded initial portion of the at least one of the selections of downloadable content.

9. The method of claim 1 further comprising deleting a portion of the at least one of the selections of downloadable content in increments less than the full amount of the portion of the at least one of the selections of downloadable content presently stored in the mobile station.

10. An apparatus comprising:
receiver;
a first memory operably coupled to the receiver and having stored therein a first transmission from a remote source comprising information regarding downloadable content, wherein the information comprises:
addresses that can be used to download corresponding selections of downloadable content; and
characterizing information regarding at least some of the selections of downloadable content;
a second memory having stored therein locally developed information regarding downloading constraints;
a scheduler that is responsive to the first memory and the second memory and that is configured and arranged to schedule when to automatically download only a portion of at least one of the selections of downloadable content as a function, at least in part, of both the characterizing information and the locally developed information.

11. The apparatus of claim 10 wherein the characterizing information comprises at least one of:
an absolute size of a given selection of downloadable content;
a relative size of a given selection of downloadable content;
a cost that is associated with downloading a given selection of downloadable content;
information corresponding to a predicted throughput rate that is associated with downloading a given selection of downloadable content;
a priority level that is associated with a given selection of downloadable content;
a priority level that is associated with a group to which a given selection of downloadable content belongs;
a time when a given selection of downloadable content will become available by downloading;
a time after which a given selection of downloadable content will be withdrawn;
a time after which a given selection of downloadable content will expire;
a time during which a given selection of downloadable content will likely be of a higher value to a user of the mobile station;
information corresponding to power requirements associated with a given selection of downloadable content;
information corresponding to power requirements associated with a group to which a given selection of downloadable content belongs.

12. The apparatus of claim 10 wherein the locally developed information comprises at least one of:
presently available communication channels by which the downloadable content can be downloaded;

a quantity of data per unit time as may be presently available via a particular presently available communication channel by which the downloadable content can be downloaded;

a cost that is associated with a presently available communication channel by which the downloadable content can be downloaded;

predicted availability of a given communication channel by which the downloadable content can be downloaded;

a present power capacity state of the mobile station;

a calculated future power capacity state of the mobile station;

at least one of a day and a time;

capacity status of a mobile station memory;

a power drain per unit of transferred data of a particular presently available communication channel by which the downloadable content can be downloaded.

13. The apparatus of claim 10 wherein the scheduler comprises means for determining when to automatically download at least a portion of at least one of the selections of downloadable content as a function, at least in part, of both the characterizing information and the locally developed information such that an overall cost of downloading the downloadable content tends becomes minimized while simultaneously ensuring that downloadable content is downloaded and available for use at the mobile station on an as-needed basis.

14. The apparatus of claim 10 wherein availability of the downloadable content to a user is automatically managed.

15. The apparatus of claim 10 further comprising a deletion controller that is configured and arranged to delete a portion of the at least one of the selections of downloadable content in increments less than the full amount of the portion of the at least one of the selections of downloadable content presently stored in the mobile station.

16. A method comprising:
at a mobile station:
receiving a first transmission from a remote source comprising information regarding downloadable content, wherein the information comprises:
addresses that can be used to download corresponding selections of downloadable content; and
characterizing information regarding at least some of the selections of downloadable content;
accessing locally developed information regarding downloading constraints;
determining when to automatically delete only a portion of the at least one of the selections of downloadable content in increments less than the full amount of a portion of the at least one of the selections of downloadable content presently stored in the mobile station as a function, at least in part, of both the characterizing information and the locally developed information.

17. The method of claim 16 wherein the locally developed information includes locally developed information regarding usage of the downloaded portion of the at least one of the selections of downloadable content presently stored in the mobile station.

* * * * *